(12) United States Patent
Bair et al.

(10) Patent No.: US 10,550,950 B2
(45) Date of Patent: Feb. 4, 2020

(54) CHECK VALVE WITH NYLON CAGE INSERT

(71) Applicant: Black Gold Pump and Supply, Inc., Signal Hill, CA (US)

(72) Inventors: Michael Bair, Los Angeles, CA (US); Simon Shin, Los Angeles, CA (US); Scott Sakakura, Los Angeles, CA (US); Christopher Lindgren, Los Angeles, CA (US)

(73) Assignee: BLACK GOLD PUMP AND SUPPLY, INC., Signal Hill, CA (US)

( * ) Notice: Subject to any disclaimer, the term of this patent is extended or adjusted under 35 U.S.C. 154(b) by 0 days.

(21) Appl. No.: 16/228,390

(22) Filed: Dec. 20, 2018

(65) Prior Publication Data

US 2019/0120397 A1  Apr. 25, 2019

Related U.S. Application Data

(63) Continuation-in-part of application No. 15/342,371, filed on Nov. 3, 2016, now Pat. No. 10,184,314.

(51) Int. Cl.
| | |
|---|---|
| *E21B 34/00* | (2006.01) |
| *F16K 27/02* | (2006.01) |
| *F16K 15/04* | (2006.01) |
| *E21B 21/10* | (2006.01) |
| *E21B 34/06* | (2006.01) |

(52) U.S. Cl.
CPC ............. *F16K 27/02* (2013.01); *E21B 21/10* (2013.01); *E21B 34/06* (2013.01); *F16K 15/04* (2013.01); *F16K 27/0209* (2013.01); *F16K 27/0245* (2013.01); *E21B 2034/002* (2013.01)

(58) Field of Classification Search
CPC ...... F16K 27/02; F16K 15/04; F16K 27/0209; F16K 27/0245; E21B 21/10; E21B 34/06; E21B 2034/002
See application file for complete search history.

(56) References Cited

U.S. PATENT DOCUMENTS

| | | | | |
|---|---|---|---|---|
| 3,534,767 | A * | 10/1970 | Swinney | F16K 27/0272 |
| | | | | 137/375 |
| 5,494,107 | A * | 2/1996 | Bode | E21B 21/10 |
| | | | | 166/242.8 |
| 5,695,009 | A * | 12/1997 | Hipp | E21B 17/06 |
| | | | | 166/196 |

(Continued)

*Primary Examiner* — Yong-Suk Ro
(74) *Attorney, Agent, or Firm* — James M. Duncan, Esq.; Klein DeNatale Goldner

(57) ABSTRACT

A check valve has a cage assembly set within a cage assembly containment portion defined within a cylindrical housing member, where the cage assembly containment portion is bounded between a first circumferential shoulder and a second circumferential shoulder of the interior of the cylindrical housing member. The cage assembly has a valve seat, a spacer member, and a nylon insert, where the nylon insert has a fluid inlet end and a fluid outlet end, where the fluid outlet end has at least one ball stop member. The valve seat is urged against the first circumferential shoulder by, in respective order, the spacer member, the nylon insert, and the second circumferential shoulder which urges the nylon insert against the spacer member. A ball travel section is defined between the valve seat and the ball stop member and a ball is disposed in the ball stop section.

20 Claims, 4 Drawing Sheets

(56) References Cited

U.S. PATENT DOCUMENTS

| | | | | |
|---|---|---|---|---|
| 5,785,083 A * | 7/1998 | Tang | ................ | F16K 15/04 |
| | | | | 137/533.13 |
| 6,685,451 B1 * | 2/2004 | Ivey | ................ | F04B 47/02 |
| | | | | 137/533.19 |
| 8,453,673 B2 * | 6/2013 | Ford | ................ | F16K 15/04 |
| | | | | 137/533.11 |

* cited by examiner

US 10,550,950 B2

CHECK VALVE WITH NYLON CAGE INSERT

CROSS-REFERENCE TO RELATED APPLICATIONS

This is a continuation-in-part application of U.S. patent application Ser. No. 15/342,371 filed on Nov. 3, 2016, to which application this application claims domestic priority.

BACKGROUND

Check valves are used in piping systems to allow the flow of a fluid (a liquid, slurry, gas, or liquid-gas) in one direction but not in the other direction. A ball-type check valve utilizes a ball which is not directly attached to any other component of the valve, but where the ball is constrained within a cage or other supporting assembly. When the fluid flows in the allowed direction, the ball is supported within the cage allowing fluid to flow around the perimeter of the ball. When the fluid flows in the opposite direction, the ball is pressed against a seat, thereby blocking fluid flow in that direction. Unlike flapper-type check valves, which only have one sealing surface, a ball-type check valve can have an infinite number of sealing surfaces created between the ball the seating ring. Because of this feature, if a portion of the ball surface is scratched or otherwise damaged, the ball will rotate until an undamaged surface of the ball finds a seal with the seat.

Among other applications, ball-type check valves may be used where the fluid flowing through the pipe contains abrasive solids. In addition, the flow velocity through the pipeline may be substantial. In such cases the valve sealing surfaces are subject to damage from erosion resulting in valve leakage and failure.

An example of such a hostile application is a production flow-line utilized in transporting hydrocarbons from an oil well to a storage tank. A check valve is required in this application to prevent fluid from the storage tank from draining back into the oil well in the event of a tubing leak or other conditions which could cause a vacuum on the flow-line. Produced fluids from oil wells may contain solids, such as sand and scale. For high volume wells, the produced fluids may also be flowing at significant flow velocities through the flow-line, Ball and seat valves utilized in a check valve may have the following general structure: (1) valve housing comprising a cylindrical tubular ball cage having a through-bore; (2) an annular seat extending perpendicularly across the flow entry end of the bore; (3) a ball positioned within the bore of the cage; and (4) a transverse ball stop extending across the exit end of the bore to limit the travel of the ball.

Some check valves, particularly those used in oil production flow-lines, pumps, may be subjected to continuous operation with the opening/closing sequence occurring thousands of times in a single day, frequently in a corrosive environment, pumping a fluid which may include abrasive solids. This repeated cycle naturally results in wear and tear as the ball travels within the ball cage and encounters the ball cage surfaces, resulting to ball wear over time.

The seal formed between the ball and seat may be subjected to substantial differential pressures and wear damage to the seal will result in undesirable backflow. A check valve which has increased resistance to damage from abrasive solids is desirable.

SUMMARY OF THE INVENTION

Embodiments of the presently disclosed check valve provide a solution to the above-identified need. An embodiment of the presently disclosed check valve has a cylindrical housing member comprising a first section having an entry end and a second section having an exit end, where a longitudinal axis is defined between the entry end and the exist end, and a housing bore extends axially through the interior of the entire length of the housing. The first section comprises a first circumferential shoulder which extends inwardly. The first circumferential shoulder has a first surface which is perpendicular to the longitudinal axis. The second section comprises a second circumferential shoulder which extends inwardly. The second circumferential shoulder has a second surface which is also perpendicular to the longitudinal axis.

A cage assembly containment portion is defined within the interior of the housing, where the cage assembly portion is bounded on the entry end by the first circumferential shoulder and bounded on the exit end by the second circumferential shoulder. A cage assembly comprising a valve seat, a spacer member, and a nylon insert are contained within the cage assembly containment portion.

The valve seat is urged against the first surface of the first circumferential shoulder by, in respective order, the spacer member, the nylon insert, and the second circumferential shoulder of the second section which urges the nylon insert against the spacer member as the second section is threaded together with the first section. A ball is disposed within the cage assembly, where the ball has a range of travel from a sealing position where the ball seals against the valve seat on the entry end to an open position wherein the ball abuts a plurality of ball stop members An embodiment of the nylon insert may comprise a fluid inlet end and a fluid outlet end, wherein the fluid inlet end is sufficiently large to receive the ball. The fluid outlet end comprises the plurality of ball stop members against which the ball seats when fluid flow through the valve is flowing from the entry end to the exit end of the cylindrical housing member, i.e., when there is normal flow through the check valve. The fluid inlet end and the fluid outlet end are configured with scalloped profiles which allow fluid flow past the ball when the check valve is receiving normal flow.

When fluid flow changes direction, such that the direction of flow is from the exit end to the entry end of the cylindrical housing, the ball lodges against the valve seat and seals off fluid flow from flowing out of the check valve.

DETAILED DESCRIPTION OF THE INVENTION

Figure 1:
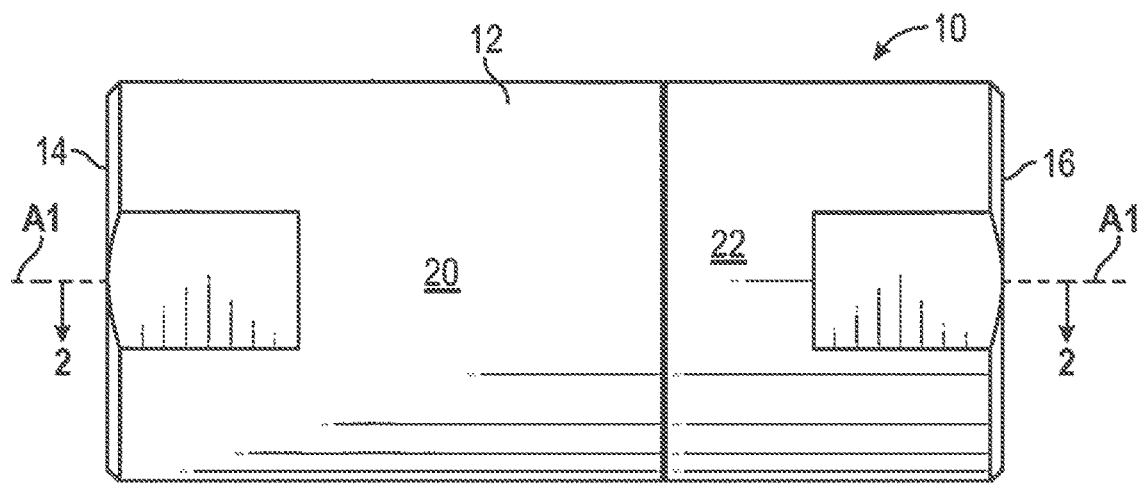
FIG. 1 depicts a perspective side view of an embodiment of the exterior of a check valve of the present invention.

FIG. 1 shows an embodiment of the presently disclosed check valve 10. FIG. 1 shows the cylindrical housing member 12, the entry end 14 of the cylindrical housing member and the exit end 16 of the housing member 12. A longitudinal axis $A_1$ is defined between the entry end 14 and the exit end 16. A housing bore 18 extends axially through the cylindrical housing member 12. Cylindrical housing member 12 may comprise a first section 20 threadably attached to a second section 22, where first section 20 has an interior 24 and second section 22 has an interior 26.

Figure 2:
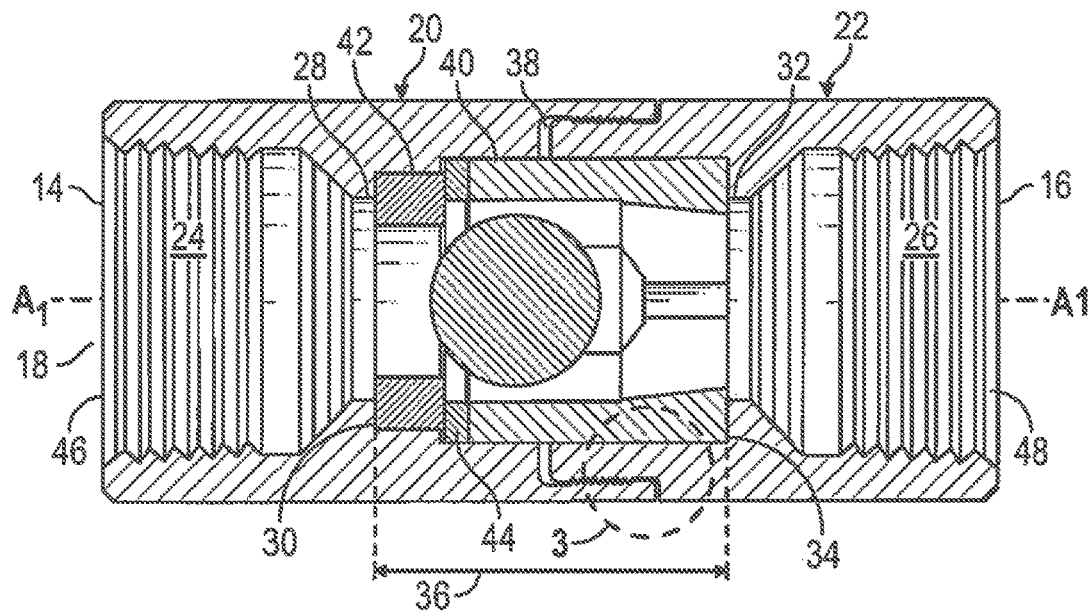
FIG. 2 depicts a sectioned view of the embodiment depicted in FIG. 1, taken along line 2-2.

FIG. 2 shows a sectional view of the cylindrical housing member 12. As shown in FIG. 2, a circumferential shoulder 28 is disposed in the interior 24 of the first section 20. Circumferential shoulder 28 comprises a surface 30 which is perpendicular to longitudinal axis $A_1$. Surface 30 is in facing contact with valve seat 42 and holds it in place. Likewise, a circumferential shoulder 32 is disposed in the interior 26 of second section 22. Circumferential shoulder 32 comprises a surface 34 which is also perpendicular to longitudinal axis $A_1$. A cage assembly containment portion 36 is defined within the cylindrical housing member 12, where the cage assembly containment portion is bounded on one end by circumferential shoulder 28 in first section 20 and bounded on the other end by circumferential shoulder member 32 in second section 22.

Figure 3:
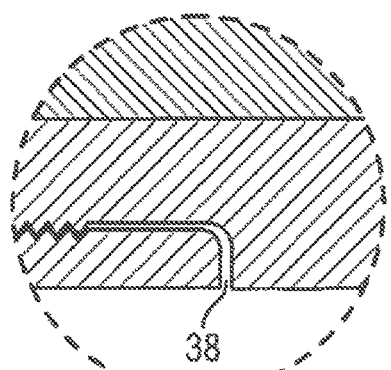
FIG. 3 is a detailed view of a fluid relief gap which closes upon application of sufficient make-up torque to the housing sections.
Figure 4:
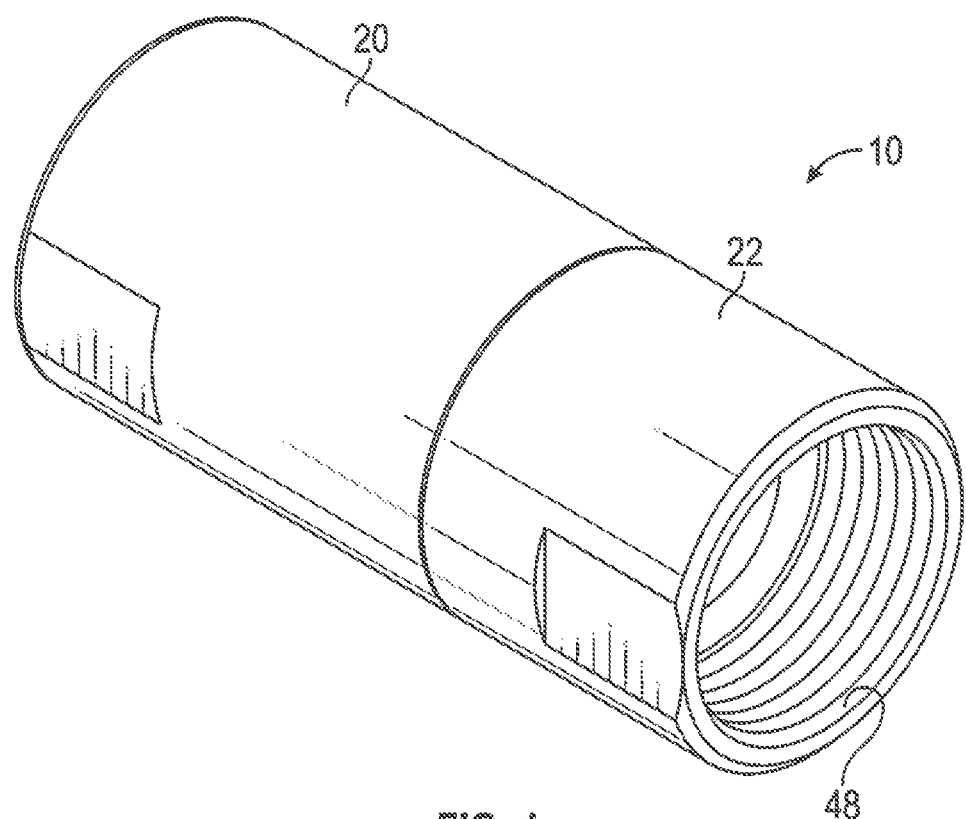
FIG. 4 is a perspective view of an embodiment of the exterior of a check valve of the present invention.

FIG. 3 shows a detailed view of a fluid relief gap 38 which closes upon application of sufficient make-up torque to the housing sections. Fluid relief gap 38 is to ensure that there is a seal between the internal components when first section 20 is properly made up to second section 22. Nylon insert 40 is compressed between first section 20 and second section 22, and until the nylon insert is compressed, it creates fluid relief gap 38. When proper torque is applied, nylon insert compresses until the faces of first section 20 and second 22 are in complete facing contact. This configuration ensures that the internal components (the "cage assembly")—nylon insert 40, valve seat 42, and spacer 44—are in facing contact with each other and surfaces 30 and 34.

When assembled, the cage assembly is disposed within cage assembly containment portion 36, wherein the valve seat 42 is urged against circumferential shoulder 28 by, in respective order, spacer member 44, nylon insert 40, and circumferential shoulder 32, which urges the nylon insert 40 against the spacer member 44 as the second section 22 is threadably attached and torqued to first section 20.

Figure 5:
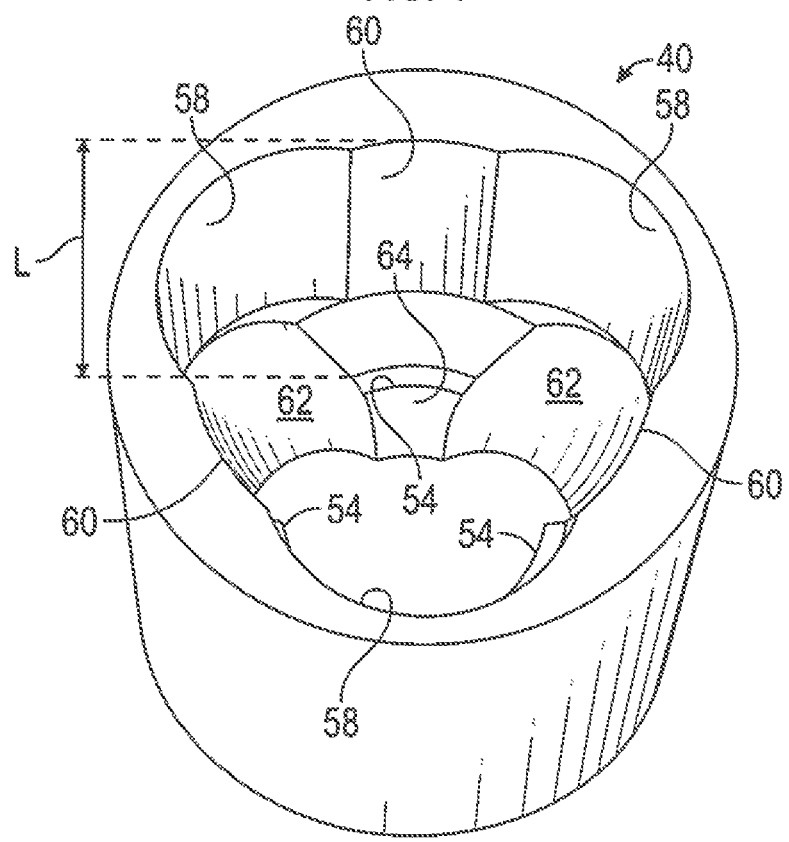
FIG. 5 is a perspective view of an embodiment of a nylon insert viewed from the fluid inlet end. is an exploded view of an embodiment of a check valve of the present invention.

A detailed view of an embodiment of a nylon insert 40 is shown in FIG. 5. Nylon insert 40 has a fluid inlet end 50 and a fluid outlet end 52. Fluid outlet end 52 comprises at least one ball stop member 54, which prevents ball 56 from escaping housing 12. Ball stop members 54 may be positioned a length L from the fluid inlet end 50. As shown in FIG. 5, fluid inlet end 50 may comprise a scalloped profile. The scalloped profile may comprise three major lobes 58. As also shown in FIG. 5, a minor lobe 60 may be positioned between each of the major lobes 58. Each of the ball stop members 54 may be located axially adjacent to a minor lobe 60.

As further shown in FIG. 5, fluid outlet end 52 of nylon insert 40 may comprise a scalloped profile. The scalloped profile of the fluid outlet end 52 may comprise three major lobes 62. A minor lobe 64 may be positioned between each of the major lobes 62. Minor lobes 62 may be axially adjacent to minor lobes 60 at the fluid inlet end 50. Minor lobes 62 at the fluid outlet end 52 may comprise ball stop members 54.

Figure 6:
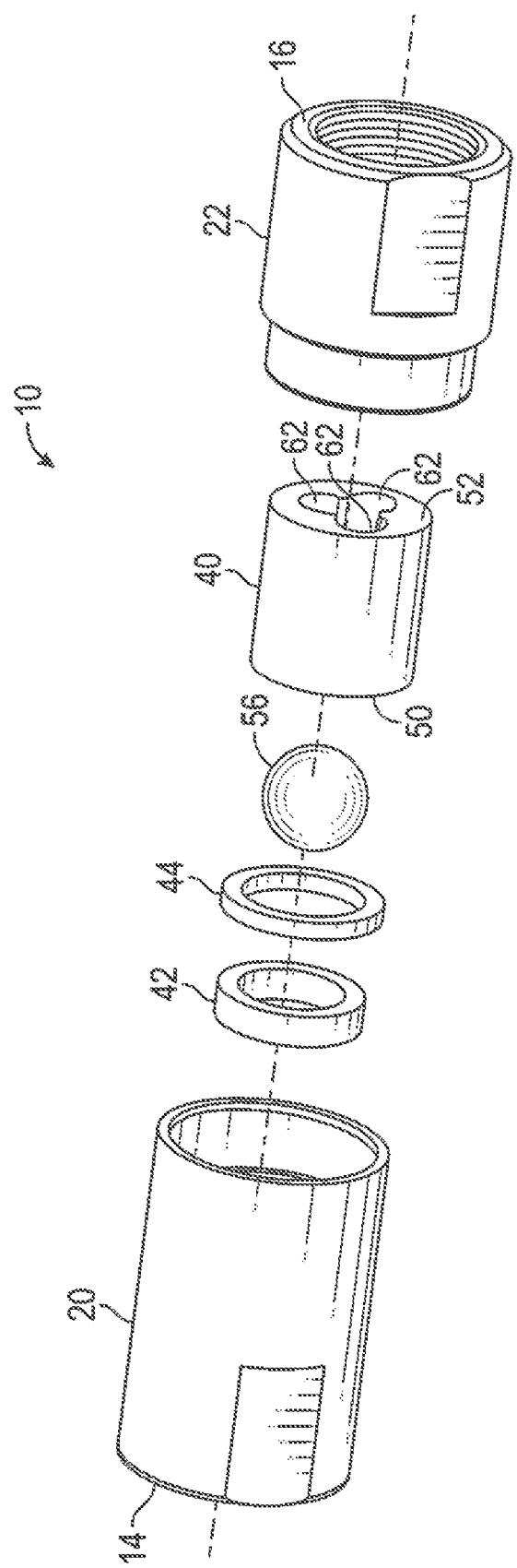
FIG. 6 is an exploded view of an embodiment of a check valve of the present invention.
Figure 7:
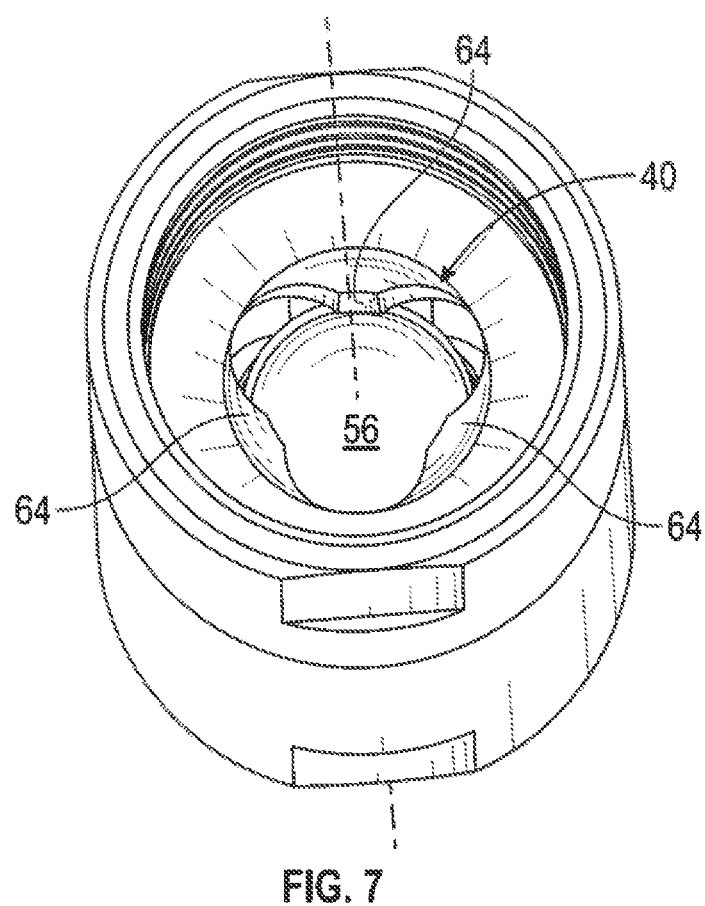
FIG. 7 is a perspective view of the exit end of the cylindrical housing, also showing the fluid outlet end of the nylon insert.

FIG. 6 depicts an exploded view of an embodiment of the disclosed check valve 10, showing the relative position of each of the components of the invention. As shown in the figures, the cylindrical housing member 12 may be equipped with wrench flats to facilitate assembly and maintenance. Embodiments of the invention will be manufactured with materials having suitable properties for the particular application, which may include oil and gas production and refinery service, as well as other processing and manufacturing plants.

Having thus described the preferred embodiment of the invention, what is claimed as new and desired to be protected by Letters Patent includes the following:

1. A check valve comprises:
    a cylindrical housing member comprising an interior, an entry end and an exit end, where a longitudinal axis is defined between the entry end and the exit end and a housing bore extends axially through the interior from the entry end to the exit end;
    a cage assembly containment portion defined within the cylindrical housing member, wherein the cage assembly containment portion is bounded between a first circumferential shoulder and a second circumferential shoulder;
    a cage assembly disposed within the cage assembly containment portion, wherein the cage assembly comprises a valve seat, a spacer member, and a nylon insert, the nylon insert comprising a fluid inlet end and a fluid outlet end, the fluid outlet end comprising at least one ball stop member, wherein the valve seat is urged against the first circumferential shoulder by, in respective order, the spacer member, the nylon insert, and the second circumferential shoulder which urges the nylon insert against the spacer member;
    a ball travel section defined between the valve seat and the ball stop member; and
    a ball disposed in the ball stop section.

2. The check valve of claim 1 wherein the fluid inlet end comprises a fluid inlet end scalloped profile.

3. The check valve of claim 2 wherein the fluid inlet end scalloped profile comprises three major lobes.

4. The check valve of claim 3 wherein a minor lobe is positioned between each of the three major lubes of the fluid inlet end scalloped profile.

5. The check valve of claim 4 comprising three ball stop members, wherein each ball stop member is axially adjacent to a minor lobe.

6. The check valve of claim 1 wherein the fluid outlet end comprises a fluid outlet end scalloped profile.

7. The check valve of claim 6 wherein the fluid outlet end scalloped profile comprises three major lobes.

8. The check valve of claim 7 wherein a minor lobe is positioned between each of the three major lobes.

9. The check valve of claim 1 wherein the fluid inlet end comprises a fluid end scalloped profile and the fluid outlet end comprises a fluid outlet end scalloped profile.

10. The check valve of claim 9 wherein the fluid inlet end scalloped profile comprises three major lobes and the fluid outlet end scalloped profile comprises three major lobes.

11. The check valve of claim 10 wherein a minor lobe is positioned between each of the three major lobes at the fluid inlet end.

12. The check valve of claim 11 wherein a minor lobe is positioned between each of the three major lobes at the fluid outlet end.

13. The check valve of claim 12 wherein each of the minor lobes positioned at the fluid inlet end is axially adjacent to a corresponding minor lobe in the fluid outlet end.

14. A check valve comprises:
a cylindrical housing member comprising a first section and a threadably attached second section, the first section having an entry end and a first section interior, the second section having a second section interior and an exit end, where a longitudinal axis is defined between the entry end and the exit end and a housing bore extends axially through the first section interior and the second section interior;
an inwardly extending first circumferential shoulder disposed in the first interior section and an inwardly extending second circumferential shoulder disposed in the second interior section;
a cage assembly containment portion defined within the cylindrical housing member, wherein the cage assembly containment portion is bounded between the first circumferential shoulder and the second circumferential shoulder;
a cage assembly disposed within the cage assembly containment portion, wherein the cage assembly comprises a valve seat, a spacer member, and a nylon insert, the nylon insert comprising a fluid inlet end and a fluid outlet end, the fluid outlet end comprising at least one ball stop member, wherein the valve seat is urged against the first circumferential shoulder by, in respective order, the spacer member, the nylon insert, and the second circumferential shoulder which urges the nylon insert against the spacer member as the second section is threadably attached to the first section;
a ball travel section defined between the valve seat and the ball stop member; and
a ball disposed in the ball stop section.

15. The check valve of claim 14 comprising a fluid weep structure between the first section and the second section, wherein the fluid weep structure permits an escape of trapped fluid until the first section and the second section are tightened to a proper torque.

16. The check valve of claim 14 wherein the fluid inlet end comprises a fluid inlet end scalloped profile.

17. The check valve of claim 16 wherein the fluid inlet end scalloped profile comprises three major lobes.

18. The check valve of claim 17 wherein a minor lobe is positioned between each of the three major lubes of the fluid inlet end scalloped profile.

19. A check valve comprises:
a cylindrical housing member comprising a first section and a threadably attached second section, the first section having an entry end and a first section interior, the second section having a second section interior and an exit end, where a longitudinal axis is defined between the entry end and the exit end and a housing bore extends axially through the first section interior and the second section interior;
an inwardly extending first circumferential shoulder disposed in the first section interior and an inwardly extending second circumferential shoulder disposed in the second section interior, the first circumferential shoulder having a first surface perpendicular to the longitudinal axis and the second circumferential shoulder having a second surface perpendicular to the longitudinal axis;
a cage assembly containment portion defined within the cylindrical housing member, wherein the cage assembly containment portion is bounded between the first circumferential shoulder and the second circumferential shoulder;
a cage assembly disposed within the cage assembly containment portion, wherein the cage assembly comprises a valve seat, a spacer member, and a nylon insert, the nylon insert comprising a fluid inlet end and a fluid outlet end, the fluid outlet end comprising at least one ball stop member, wherein the valve seat is urged against the first surface of the first circumferential shoulder by, in respective order, the spacer member, the nylon insert, and the second circumferential shoulder which urges the nylon insert against the spacer member as the second section is threadably attached to the first section;
a ball travel section defined between the valve seat and the ball stop member; and
a ball disposed in the ball stop section.

20. The check valve of claim 19 comprising a fluid weep structure between the first section and the second section, wherein the fluid weep structure permits an escape of trapped fluid until the first section and the second section are tightened to a proper torque.

* * * * *